Aug. 15, 1933.　　　　F. M. REID　　　　1,922,395
TRACTOR SEMITRAILER
Filed Jan. 29, 1932　　　2 Sheets-Sheet 1
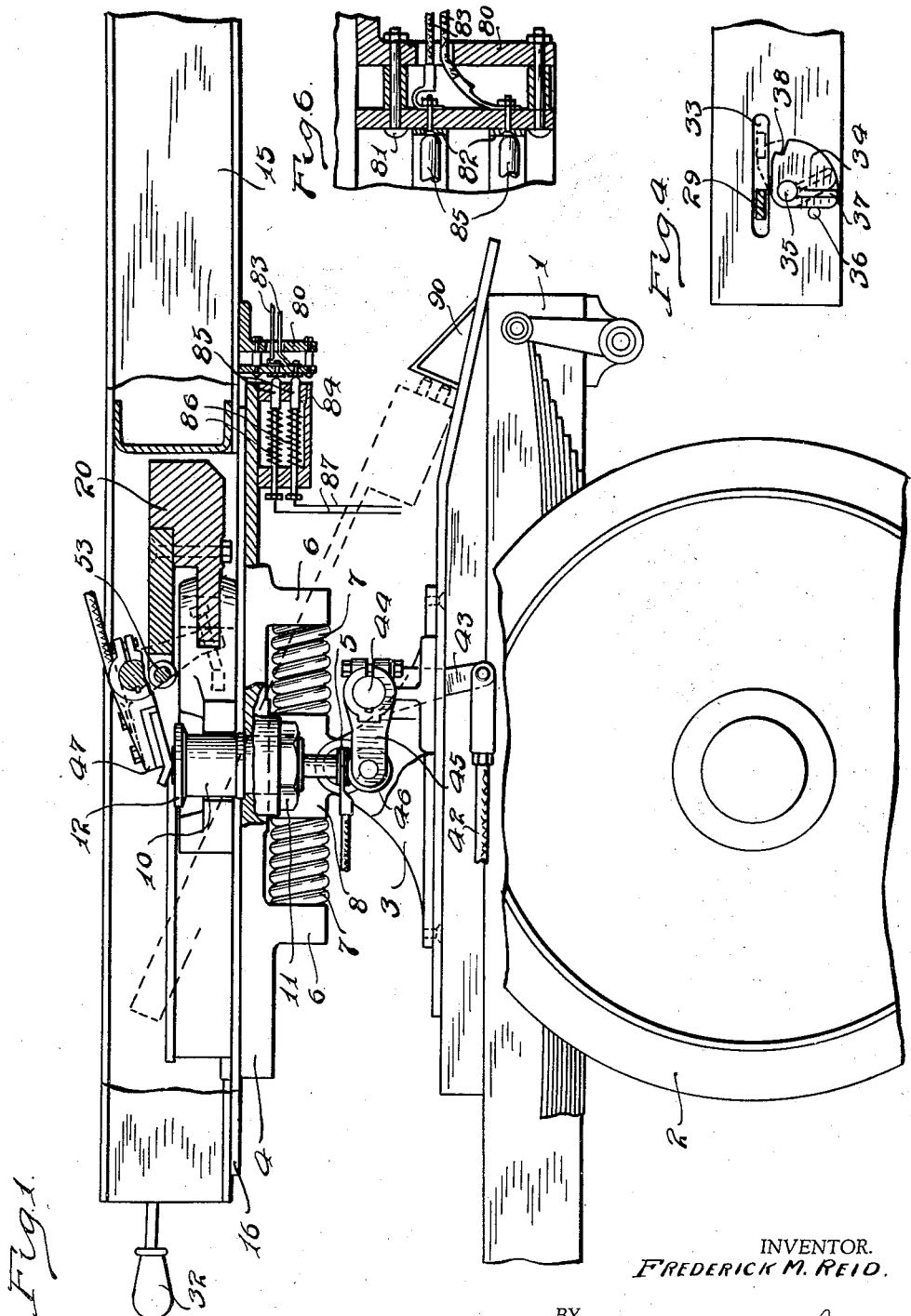
INVENTOR.
FREDERICK M. REID.
BY
Barnes, Kisselle & Laughlin
ATTORNEYS.

Aug. 15, 1933.  F. M. REID  1,922,395
TRACTOR SEMITRAILER
Filed Jan. 29, 1932  2 Sheets-Sheet 2
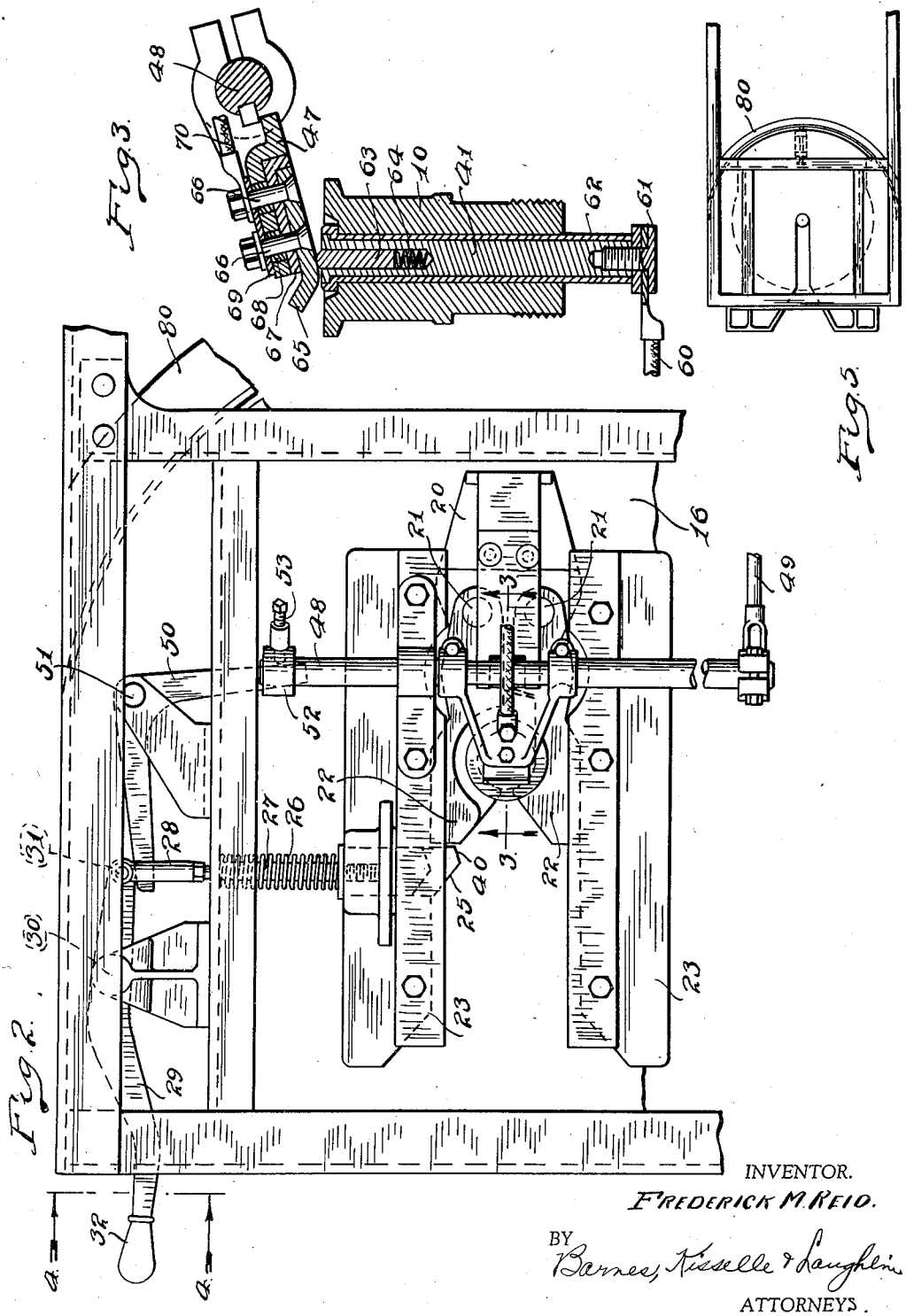
INVENTOR.
FREDERICK M. REID.
BY
ATTORNEYS.

Patented Aug. 15, 1933

1,922,395

UNITED STATES PATENT OFFICE 1,922,395

TRACTOR SEMITRAILER

Frederick M. Reid, Detroit, Mich., assignor to Fruehauf Trailer Company, Detroit, Mich., a Corporation of Michigan Application January 29, 1932. Serial No. 589,656

9 Claims. (Cl. 280—33.1)

This invention relates to a tractor-semitrailer combination. In such a combination the tractor usually has rear traction or driving wheels, wheels at the front usually dirigible, and the semitrailer comprises a frame with running gear or ground-engaging wheels at its rear end, but which at its forward end rests upon the tractor, connected thereto by a joint such as a fifth wheel. Thus the entire vehicle may be one having three sets of wheels, and is sometimes called a "six wheeled" vehicle, with an articulated joint or connection between the tractor vehicle and the trailer vehicle.

The present invention is directed to an improved arrangement at the coupling between the tractor and semitrailer by means of which certain controls may be effected on the trailer by an operator or the like on the tractor. The particular structure shown herein is one embodying a king pin type of connection between the tractor and semitrailer, and the arrangement of parts is such as to provide for mechanical control of parts on the trailer and for electrical control of any suitable mechanism on the trailer, deriving its source of energy from the power unit or tractor. As regards the mechanical features, an improved mechanism is provided on the trailer such as to permit of obtaining the desired mechanical movements on the trailer from a position of the tractor, and also permitting of obtaining certain mechanical movements by a direct actuation of parts on the trailer.

In the accompanying drawings:

Fig. 1 is a view partly in section illustrating the rear end of the tractor and the forward end of the trailer showing them in coupled relation.

Fig. 2 is a plan view of the coupling parts.

Fig. 3 is an enlarged section taken substantially on line 3—3 of Fig. 2.

Fig. 4 is a view partly in section looking in the direction of the arrows 4—4 of Fig. 2.

Fig. 5 is a somewhat diagrammatic view reduced in size showing an electrical contact structure.

Fig. 6 is an enlarged detail view.

The rear end of a tractor frame is illustrated at 1 with traction wheels at 2. Brackets 3 may be secured to the tractor frame upon which is mounted a fifth wheel plate or lower fifth wheel member 4 advantageously fulcrumed on the brackets as at 5 so the same may rock. The fifth wheel may have depending projections, as at 6, with coil springs 7 interposed between the projections and a fixture 8 thus permitting fore and aft movement to take up shocks or the like. A king pin 10 may be carried by the lower fifth wheel plate 4 and be secured thereto as by means of a nut 11, and it may have an enlarged head as at 12.

The trailer frame is illustrated at 15, and in use with the tractor is arranged to rest upon the lower fifth wheel 4, for which purpose the trailer frame may have an upper fifth wheel or plate structure 16. In establishing a coupling, the tractor is adapted to be backed under the trailer with the lower fifth wheel 4 being inclined rearwardly so as to push itself under the front end of the trailer frame with the trailer frame riding up the incline of the fifth wheel to coupling position.

The trailer and tractor may be locked together by means of locking devices on the trailer frame adapted to engage around the king pin on the tractor. This particular locking device may be like that shown and described in my Patent #1,641,354 of September 6, 1927. Briefly, it may be pointed out that the locking structure on the trailer may comprise a reciprocable head 20 upon which are pivotally mounted, as at 21, locking jaws 22. The jaws and the head are designed to reciprocate in undercut guideways 23. In the position shown in Fig. 2, the guideways hold the jaws 22 locked around the king pin. If the jaws and head are pulled forwardly or from right to left in Fig. 2, the jaws may project out from the undercut guideways, open up and release the king pin. As the tractor moves back the king pin may enter the open jaws, push them rearwardly to locked position, the same being closed around the king pin by the undercut guideways. After a manner now known in the art, a service bar may be attached to the reciprocating locking head in the trailer frame so that in the movements of the locking head in coupling and uncoupling, desired service movements may be obtained utilizing the movement of the bar.

To hold the head in locked position there may be a plunger or latch 25 positioned to project into the path of the reciprocating locking head. This plunger may be urged into locked position by a spring 26, and a rod 27 may pass through the spring and have connected to one end a yoke 28. An operating lever 29, which may be pivoted as at 30, may be pivotally connected as at 31 to the yoke 28. This operating lever has handle portion 32 and the lever may project through a slot 33 in the trailer frame. A catch device 34 may be pivoted to the frame, as at 35, normally arranged to gravitate against a stop 36 and it may be a wing or projection 37 for engagement by an operator. This catch may be notched as at 38. In its normal position, as shown in the full lines of Fig. 4, it is free of the slot 33. In order to position the plunger 25 so that the locking head may be reciprocated to release its connection to the king pin, the lever 32 may be shifted manually from left to right, viewing Fig. 4, thus retracting the plunger or latch 25; then the stop 34 may be swung to the dotted line position so that the lever is held in a notched portion; the pressure of the spring 26 will hold the parts in this position. The bolt 25 is to be retracted to a position illustrated by the dotted lines illustrated in Fig. 2 thus leaving an inclined face 40 in the path of one of the jaws. As the tractor pulls forward this inclined face functions to position the plunger further out of the guideways causing the lever 29 to release its frictional engagement with the catch 34 so that the catch then gravitates against the pin 35. The plunger 25 is now free to project to its locking position so that it will snap in front of the locking jaw to automatically couple the tractor and trailer as the locking jaws are slid back by the king pin as the tractor moves back under the trailer.

For transferring mechanical movement from the tractor to the trailer the king pin may be axially bored, as illustrated in Fig. 3, in which is mounted an operating pin 41. This pin may be reciprocated from the tractor by means of a rod 42 which may be actuated by a suitable lever and which is connected to an arm 43 for rocking shaft 44. Joined to shaft 44 is an arm 45 which engages underneath the actuating pin 41 preferably through an electrical insulation member such as a roller 46. Upon movement of the rod 42 from right to left, viewing Fig. 1, the pin 41 is raised to in turn raise an arm 47, the same rocking shaft 48. The means to be operated may be trailer brakes. For this purpose a brake rod 49 may be connected to the shaft 48. Similarly, the locking bolt 25 may be actuated. For this purpose a bell crank member 50 may be pivoted to the frame of the trailer, as at 51, having one arm disposed through the yoke 28, and the other arm engageable by an adjustable screw abutment 53 carried by a member 52 secured to the rock shaft 48.

Accordingly, the brakes of the trailer may be operated by an operator positioned on the tractor. If it be desired to disconnect the tractor and trailer, the shaft 44 may be actuated to in turn rock shaft 48 on the trailer through the reciprocating pin and associated mechanism, this causing a rocking of the bell crank 50 through the means of the screw abutment 53 pushing on one arm of the bell crank, and retraction of the bolt 25. The tractor may now be moved forwardly and the two vehicles disconnected. The brakes of the semitrailer may be applied at this time due to the shaft 48 having been rocked. To maintain the brakes applied the reciprocable head 20 may be moved from right to left, as Fig. 1 is viewed, underneath the arm 47 to keep the same in its elevated position. To aid in this a roller 54 may be provided for moving in under the arm 47. The roller 54 may move in under the arm 47 and lift it during the uncoupling of the vehicles if the arm has not been previously raised by actuation from the tractor. In this release of the plunger 25 from the tractor the actuating lever 29 is rocked, but due to the fact that the member 34 gravitates against stop 36, there is no interference to the movement of the lever 29. The stop member 34 is only utilized when the lock release is made by actuation of the lever 29.

An electrical conductor, as at 60, which may lead from a suitable source of electrical power, may be connected to the actuator pin 41 by means of a headed screw 61. A bushing or sleeve of insulation 62 may surround the pin 41 to insulate it from the king pin. The pin 41 may have a recess at its upper end in which is disposed a plunger 63 actuated by a spring 64. A plate 65 may be secured to the arm 47 by bolts 66 with the plates and bolts insulated from the arm 47 by an insulation piece 67, insulating bushings 68, and insulating washers 69. An electrical conductor 70 may be connected to the structure as by a connection under a nut on the end of one of the bolts 68, as shown.

The spring pressed plunger 63 makes contact with the plate 65 so that an electrical connection is made between the conductors 60 and 70. Thus the mechanical actuator pin constitutes at once a mechanical device and an electrical conductor. The source of electrical power of the tractor may be utilized in conjunction with any electrically operated device on the tractor whether the same be merely devices for illumination, such as tail lamps or the like, or for power purposes.

Other electrical connections may be provided from tractor to trailer in addition to the electrical contact effected through the king pin.

A curved support member struck on an arc around the king pin, which may be in the form of an angle iron 80 may be carried on the under side of the trailer and it may support a curved insulation member 81 through the means of bolts and spacer members, as shown. This insulation member may be of any electrical insulating material, such as hard rubber, a phenol condensation product or the like, and it may carry any desired number of contact strips of which two are shown, as at 82. Conductors 83 may connect to the strips by means of bolts or the like as shown.

The support 80 is preferably designed to cooperate with the fifth wheel member on the tractor, and for this purpose, as shown in Fig. 1, may be disposed adjacent the same and the rear portion of the fifth wheel member on the tractor may be curved to substantially correspond to the curvature of the support, as shown in Fig. 5. Carried by the lower fifth wheel member may be a box structure 84 preferably of an insulation material such as wood, rubber, or phenol condensation product, carrying plungers 85 acted upon by springs 86 located within the box structure normally urging the plungers toward the right. Electrical wires 87 on the tractor connect, respectively, to the plungers.

In coupled position of the tractor and semitrailer the upper fifth wheel is caused to take a position abutting the underside of the trailer with the result that the plungers are spring pressed into engagement with the contact strips 82. As the two vehicles articulate in operation the plungers wipe the surfaces of the strips and make constant contact therewith. The extent of the bracket member 80 and contact strips is preferably such as to take care of all normal angular relations which the tractor and trailer vehicles may take. When the vehicles separate, the lower fifth wheel inclines rearwardly, as illustrated by the dotted line position shown in Fig. 1, and the box structure and the plungers carried thereby may be protected by an auxiliary pick-up plate 90.

Thus a number of electrical devices may be disposed on the trailer and each controllable from the tractor and operated by the source of electrical power on the tractor. For exemplifying this further, the electrical contact running through the king pin may be employed for controlling a mechanical contrivance such as, for example, electric brakes for the traction wheels. One of the electrical connections comprising a plunger and curved contact strip may establish electrical connection for the tail light or the like, while the other may be the means by which a number of other lights may be illuminated for indicating the nature of the entire vehicle. Each circuit may be controlled by a suitable switch or the like from the driver's cab.

I claim:

1. In a tractor-trailer combination, cooperating interengaging coupling devices, a latch on the trailer for holding the coupling devices in locked position, a rock shaft on the trailer an arm secured thereto, a reciprocating actuator pin extending through the axial center of the coupling device, means on the tractor for actuating the pin, said pin engaging the arm on the rock shaft, and means operable by rocking movement of the shaft to move the latch to unlocking position.

2. In a tractor-trailer combination, a king pin on the tractor, locking devices on the trailer for engaging the king pin, a locking latch, a spring for holding the latch in position for maintaining the king pin and locking devices in coupled relation, a lever for moving the latch, a gravitating catch for holding the lever with the latch released, an actuator pin on the axial center of the king pin, means for shifting the actuator pin from the tractor, means on the trailer connecting the actuator pin to the latch for releasing said latch, said lever being movable with the latch when the same is moved by the actuator pin freely of the gravitating catch.

3. In a tractor trailer combination, a king pin on the tractor, reciprocatory locking jaws on the trailer for engaging around the king pin, a latch for holding the reciprocatory jaws in locked position around the king pin, an actuator pin positioned to reciprocate through the king pin, means on the tractor for reciprocating the actuator pin, means on the trailer operatively connecting the actuator pin to the latch whereby movement of the same may release the latch, a lever on the trailer connected to the latch and operable independently of the mechanism connecting the reciprocating pin to the latch, and a gravitating catch for holding the lever in latch released position.

4. In a tractor-trailer combination, a king pin on the tractor, reciprocatory locking jaws on the trailer, a latch for holding the jaws in position around the king pin, spring means for holding said latch in locked position, a reciprocable actuator pin disposed through the king pin, means on the tractor for reciprocating the same, a rock shaft on the trailer operatively associated with the actuator pin, and a bell crank interconnecting the rock shaft and the latch.

5. The combination with a tractor and semi-trailer interconnected by a king pin and locking elements engaging the king pin, an actuator pin disposed on the axial center of the king pin, mechanical operating means on the trailer associated with the actuator pin, mechanical means on the tractor for reciprocating the actuator pin to operate the mechanical means on the trailer, means electrically insulating the actuator pin from the king pin, an electrical conductor on the tractor connecting to the actuator pin, an electrical conductor on the trailer connecting to some of the mechanical operating means, and an insulated part on the mechanical operating means having electrical contact with the actuator pin.

6. The combination with a tractor and semi-trailer interconnected by a king pin and locking elements for engaging the king pin, an actuator pin disposed in the axial center of the king pin, means on the tractor for reciprocating the same, operating means on the trailer operatively associated with said actuator pin, said operating means on the trailer including an electrically insulated part in contact with the actuator pin, an electrical conductor on the trailer connected to said insulated part, a conductor on the tractor connected to the actuator pin, an insulation bushing surrounding the actuator pin, and a spring pressed plunger carried by the actuator pin and directly engaging the said insulated part of the operating means on the trailer.

7. The combination with a tractor and semi-trailer interconnected by a king pin and coupling means for engaging the same, a brake rod on the trailer, a rock shaft connected thereto, an arm on the rock shaft, an actuator pin reciprocably mounted in the king pin, means on the tractor for reciprocating the pin, said arm on the rock shaft and pin being associated for interengagement, said arm including an insulated part, an electrical conductor connected thereto, an electrical conductor on the tractor connected to the actuator pin, means insulating the actuator pin from the king pin, and insulation means between the actuator pin and reciprocating means.

8. The combination with a tractor and semi-trailer interconnected by a king pin and coupling means for engaging the same, a brake rod on the trailer, a rock shaft connected thereto, an arm on the rock shaft, an actuator pin reciprocably mounted in the king pin, means on the tractor for reciprocating the pin, said arm on the rock shaft and pin being associated for interengagement, said arm including an insulated part, an electrical conductor connected thereto, an electrical conductor on the tractor connected to the actuator pin, insulation means between the actuator pin and king pin, insulation means between the actuator pin and reciprocating means, said actuator pin having a recess therein, a plunger in the recess, and a coil spring backing up the plunger and serving to maintain the same in contact with the insulated part of said arm.

9. In combination with a tractor and semi-trailer interconnected by a king pin and coupling devices for engaging the same, an actuator pin in the king pin, means on the tractor for reciprocating the same, mechanical means on the trailer operatively associated with the actuator pin to be operated thereby including a part for engagement with the actuator pin, electrical conductor means on the tractor connected to the actuator pin, electrical conductor means on the trailer connected to said part, means for insulating the actuator pin from the king pin, and a spring pressed plunger in the actuator pin for establishing an electrical contact with the said part of the operating mechanism of the trailer and to maintain said electrical connection independently of the mechanical connection between the actuator pin and said part.

FREDERICK M. REID.